March 9, 1965  H. DOMANN  3,173,074
VOLTAGE REGULATOR WITH RC-CONTROL
Filed Dec. 1, 1961

INVENTOR
Helmut Domann
by:
Michael S. Striker
Attorney

United States Patent Office 3,173,074
Patented Mar. 9, 1965

3,173,074
VOLTAGE REGULATOR WITH RC-CONTROL
Helmut Domann, Stuttgart, Wurttemberg, Germany, assignor to Robert Bosch G.m.b.H., Stuttgart, Germany
Filed Dec. 1, 1961, Ser. No. 156,365
Claims priority, application Germany, Dec. 3, 1960, B 60,345
25 Claims. (Cl. 322—28)

The present invention concerns voltage regulators for shunt-excited low voltage generators operating at greatly varying speeds, particularly for generators used as lighting generators in vehicles. In particular, the invention concerns regulators which are fully transistorized and comprise a control transistor connected with a voltage divider to which the generator output voltage is applied, and an operating transistor the base of which is connected both with the collector electrode of the control transistor and with a resistor connected between the collector of the control transistor and one of the output lines of the generator, while the collector of the operating transistor is connected in series with the exciter coil of the generator.

In known regulators of this type the operating transistor is so connected with the control resistor that the former is first of all fully conductive when the generator is started from standstill so that hereby the self-excitation of the generator is warranted, while the operating transistor is abruptly changed to non-conductive condition as soon as the output voltage reaches a predetermined normal value. However, it has been found that it is very difficult to render the operating transistor completely non-conductive when the ambient temperature in and around the regulator is comparatively high because at the comparatively high operating temperatures frequently occurring particularly in the vicinity of the engine of a motor vehicle a transistor has a comparatively high natural conductivity which would permit the flow of its collector current to and through the exciter coil of the generator even if the emitter-base circuit of the transistor were short-circuited.

It has been assumed up to now that the above difficulty cannot be overcome except by rather inconvenient means which solve one part of the problem without, however, avoiding a considerable development of heat in the circuit components immediately adjacent to the operating transistor so that the latter is again exposed to raised temperatures. This is of particular disadvantage if a generator equipped with the regulator in question is operated on motor vehicles in which case it is highly desirable that the generator output voltage reaches its desired normal value already at comparatively low rotary speeds of the engine or generator.

It is therefore a main object of the invention to provide for a regulator which avoids the above mentioned difficulties.

It is another object of this invention to provide for a regulator of the type set forth which is entirely reliable in operation and is composed of a comparatively small number of components.

With above objects in view a preferred embodiment of the invention comprises in a regulator for low-voltage shunt-excited generators operated at greatly varying speeds, particularly for vehicle lighting generators, in combination, voltage divider means connected across the output terminals of the generator; control transistor means connected at its base with an intermediate tapping point of said voltage divider means for applying to said base of said control transistor a predetermined portion of the generator output voltage; at least one second transistor means having its base connected with the collector of said control transistor means for being controlled thereby and being in circuit with the generator for controlling the output voltage of the latter; resistor means connected between said collector of said control transistor means and one of the output terminals of the generator; and a parallel-combination including a capacitor means and a second resistor means being connected between said base of said second transistor means and said collector of said control transistor means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
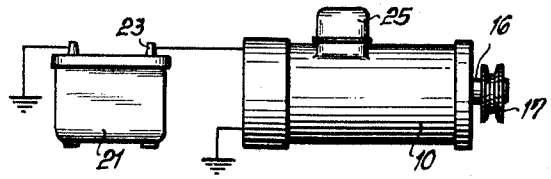
FIG. 1 is a diagrammatic elevation of the electric lighting plant of a motor vehicle, comprising a generator, a regulator and a battery.
Figure 2:
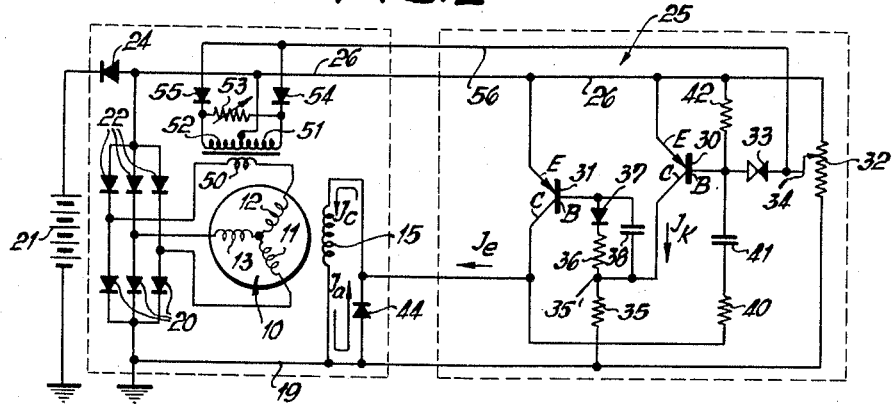
FIG. 2 is a schematic circuit diagram of the generator and the regulator connected with each other.

As illustrated by FIGS. 1 and 2, a three-phase generator contains within its housing 10 three stationary alternating current coils 11, 12 and 13 and a rotating field comprising an exciter coil 15 carried by the not illustrated armature and rotatable with respect to the stationary coils 11–13 by the not shown engine through a belt drive including the pulley 17 carried on the armature shaft 16. Each of the coils 11 to 13 is connected by one of the rectifiers 20 with the grounded negative output 19, and by one of the rectifiers 22 with the positive output line 26. The positive output line 26 is connected with the positive terminal of the battery 21 and, if desired, with other consumers of electric energy, the negative terminal of the battery 21 being grounded. In this manner the generator will charge the battery and supply other consumers provided that the generator is operated at sufficiently high speed. In order to prevent the battery 21 from discharging across the generator and the regulator circuit described below, when the generator is standing still, a rectifier 24 acting as a cut-out switch is provided in the positive output line between the generator and the battery. This rectifier 24 has the additional function to ensure that the regulator described further below will operate only depending upon the output voltage of the generator appearing between the lines 19 and 26, but never depending upon the prevailing voltage at the terminals of the battery 21.

The regulator housing 25 contains two germanium transistors 30 and 31 of the p-n-p type, a potentiometer 32 connected across the output lines 19 and 26, and a Zener diode 33 which provides for a fixed reference voltage value. The transistor 30 is connected at its base via the Zener diode 33 with the movable tap 34 of the potentiometer 32 and acts as a control transistor for controlling the operating transistor 31. The emitter-collector circuit of this second transistor is connected in series with the exciter coil 15 of the generator so as to furnish to the latter an exciter current $J_e$ as long as the output voltage of the generator remains below a predetermined normal value. By way of example this value would be in the described embodiment equal to 14 volts. In order to have circuit components the base of the operating transistor 31 is conductively connected with the collector of the control transistor 30. This collector is connected across a load resistor 35 of about 20 ohms with the negative output line 19. As long as the generator output voltage has not yet reached the predetermined normal value thereof, and as long as the voltage differential existing between the positive output line 26 and the tap 34 of the potentiometer 32 has not yet reached the breakdown voltage of 8 volts of the Zener diode 33, no current flows through the Zener diode and the emitter-base circuit of the control transistor connected in series therewith. The control transistor 30 is under these conditions non-conductive while the operating transistor 31 carries a current via its basis and the resistor 35 so that it is conductive and furnishes the exciter current $J_e$ for the exciter coil 15 of the generator.

As soon as the two above mentioned voltage values are exceeded, the Zener diode 33, being under load in its blocking direction, is rendered strongly conductive as a result of which the control transistor, in view of the now starting collector current $J_k$ flowing through the resistor 35, starts to change the operating transistor 31 to non-conductive condition.

In order to make sure that this non-conductive condition of the operating transistor 31 is obtained even in the presence of comparatively high ambient temperatures and therefore also in the case of high operating temperatures of the transistor 31, the invention provides for the arrangement of a resistor 36 connected between the base of the operating transistor 31 and the junction point 35' located between the collector of the control transistor 30 and the resistor 35, the resistor 36 being connected in series with a semi-conductor rectifier 37, made preferably of silicon, a capacitor 38 of about .5 μf. being connected in parallel with the series-combination 36, 37. The rectifier 37 is so arranged that its direction of conductivity coincides with the direction of the base current of the operating transistor 31 which flows via the resistors 36 and 35 to the negative line 19 whenever the operating transistor 31 is conductive. The resistor 36 has a value of about 5 ohms so that, if the predetermined normal value for the generator output voltage is 14 volts, the flow of the just mentioned base current through the resistor 36 causes a voltage drop of about 5.2 volts, while across the rectifier 37 a voltage drop of about .8 volt appears. Therefore, the capacitor 38 can be surely expected to be charged to a potential of 6 volts as long as the operating transistor 31 is in conductive condition. As soon as the collector current $J_k$ of the control transistor 30 starts to flow, this current causes across the resistor 35 a voltage drop of about 13.5 volts. This just mentioned voltage drop is additively increased by the potential of the still charged capacitor 38 so that the base potential of the operating transistor 31 is abruptly increased to 13.5+6=19.5 volts which means that this potential is 5.5 volts more positive than the emitter potential of the operating transistor. Under these conditions it is impossible that any current can flow through the emitter-base circuit of the operating transistor even if the latter has a comparatively noticeable natural conductivity, and in this manner the operating transistor is sure to be rendered non-conductive even at any practically occurring operating temperature.

Since now the flow of an exciter current $J_e$ is made impossible, the output voltage of the generator drops below the predetermined normal value. Whenever this occurs, the Zener diode 33 is not capable of carrying a current in the required direction so that the control transistor 30 is rendered non-conductive and the operating transistor 31 is caused to return to its fully conductive condition. Consequently the excitation of the generator and accordingly its output voltage are enabled to rise again so that the above described cycle of operations repeats.

The parallel combination of the resistor 36 and the capacitor 38 has the above described effect even if the rectifier 37 is not included in the combination. However, the use of this rectifier entails the advantage that the capacitor 38 cannot be discharged completely but retains a residual charge potential corresponding to the threshold value of about .7 volt of the rectifier 37. In this manner it is possible to make sure that even with a capacitor 38 of rather small capacity the potential at the base of the operating transistor 31 remains always positive with respect to its emitter and therefore the operating transistor is kept in non-conductive condition until the control transistor returns to its original non-conductive condition.

In large size generators the comparatively large inductivity of the exciter coil and the large inductivities of the alternating current coils have the effect that the output voltage of the generator follows any variation of the exciter current only with a certain delay which is the greater the larger is the generator. In order to avoid in such a case a noticeable waviness of the output voltage and in order to obtain a regulator performance which is rapid and sensitive and independent of the size of the generator, a further modification of the invention provides for a feedback circuit between the collector of the operating transistor 31 and the base of the control transistor 30, this feedback circuit comprising a resistor 40 and a capacitor 41 connected in series therewith. In addition a resistor 42 of about 300 ohms is connected in parallel with the emitter-base circuit of the control transistor 30 in such a manner that it constitutes, together with the capacitor 41 of .1 μf. and the resistor 40 of 6000 ohms a voltage divider. Through this voltage divider arrangement the base of the control transistor 30 is supplied with a portion of that voltage which develops when the exciter current $J_e$ is interrupted upon the operating transistor becoming non-conductive. This is due to the fact that when the transistor 31 becomes non-conductive and inductive counter-voltage is generated in the exciter coil 15 which gives rise to a compensating current $J_a$ which flows through a semi-conductor diode 44 and produces a voltage drop across the latter amounting to about .5 volt. Under these circumstances the collector of the now non-conductive operating transistor 31 carries a potential determined by the prevailing potential in the negative output line 19 minus the just mentioned voltage drop of .5 volt. Consequently, the capacitor 41 starts to be charged which gives rise to an additional current flowing via the emitter base circuit of the control transistor 30 so as to render this transistor even more conductive than would correspond to the actual voltage difference between the predetermined normal voltage value and the actual voltage value available at the tap 34 of the potentiometer 32. In this manner one achieves that the two transistors 30 and 31 always change very abruptly between conductive and non-conductive conditions. In addition, the charging current flowing to the capacitor 41 creates a voltage drop across the resistor 42 which slightly reduces the voltage differential between the electrodes of the Zener diodes 33. Consequently, this diode 33 is able to become non-conductive substantially earlier, even before the generator output voltage has dropped a considerable amount. This, however, results in a substantially more rapid change between the alternating periods of full conductivity and full non-conductivity of the two transistors 30 and 31 and consequently in a substantially reduced waviness of the generator output voltage.

Figure 3:
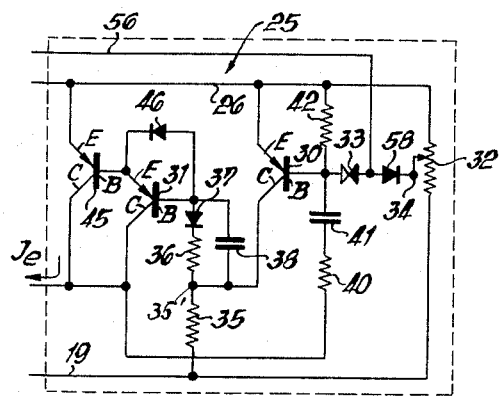
FIG. 3 is a partial circuit diagram of the arrangement according to the invention, illustrating a modification of the regulator arrangement differing from that illustrated in FIG. 2.

The embodiment of the regulator according to FIG. 3 constitutes a further development and improvement over the regulator illustrated by FIG. 2. All those elements which are identical with or function in the same manner as those illustrated in FIG. 2 are designated in FIG. 3 with the same reference numerals. In contrast with the arrangement according to FIG. 2, the regulator according to FIG. 3 does not use the second transistor 31 which is connected at its base with the control transistor 30, as a power switch device for controlling directly the exciter current of the generator. Instead the transistor 31 functions as a current amplifier for a separate operating transistor 45 the emitter of which is directly connected to the positive output line 26 and the collector of which is connected in series with the exciter coil of the generator. In order to avoid the need for a resistor connected between the base of the operating transistor 45 and the negative output line 19 which would only produce a very substantial amount of heat, the second transistor 31 is connected with its emitter-collector circuit in parallel with the base-collector circuit of the operating transistor 45. Whenever the second transistor 31 is rendered non-conductive upon the output voltage becoming equal to the predetermined normal value, also the operating transistor 45 is rendered non-conductive. In order to enhance the effect of the then non-conductive emitter-collector circuit of the second transistor 31 an additional germanium rectifier 46 is provided the input electrode of which is connected with the base of the transistor 31 while its output electrode is connected with the emitter of the transistor 31 and simultaneously with the base of the operating transistor 45. This has the effect that the base of the operating transistor 45 is kept always at the same potential as the base of the second transistor 31 because the rectifier 46 is conductive in this direction, the potential at the base of the transistor 31 being determined by the charge of the capacitor 38 as long as the adjust mentioned two transistors are in non-conductive condition.

Both embodiments comprise additionally a current limiting arrangement which serves the purpose of substantially reducing the output voltage of the generator whenever, e.g. due to a short-circuit in one of the electric energy consumers, the load current of the generator should exceed a predetermined permissible maximum. For this purpose, as shown in FIG. 2, the primary winding 50 of a current transformer is inserted in the connection from the alternating current coil 12 to the rectifiers 20 and 22, this tranformer comprising further two series-connected secondary windings 51 and 52, the junction point between these windings being directly connected with the positive output line 26. A variable resistor 53 is connected in parallel with the series combination 51, 52. It is clear that the voltages induced in the secondary windings 51, 52 are always proportional to that portion of the load current which flows through the primary winding 50. The secondary voltages are rectified by rectifiers 54 and 55 and applied to the tap 34 of the potentiometer 32 via line 56. As soon as the potential between the positive output line 26 and the line 56 exceeds the breakdown voltage of the Zener diode 33 the latter becomes conductive irrespective of the actual value of the generator output voltage and thus causes the control transistor 30 and the transistor 31 to change to non-conductive condition.

While in the embodiment according to FIG. 2 the rectifiers 54 and 55 are connected by line 56 directly with the tap 34 of the potentiometer 32 so that the potentiometer 32 constitutes a load for the above mentioned rectified voltage, the embodiment according to FIG. 3 differs insofar as a germanium diode 58 is connected between the tap 34 of the potentiometer and the junction point between 56 and the Zener diode 33, the diode 58 being conductive for the base current of the transistor 30. This additional diode 58 has the effect that the potentiometer does not constitute a load for the rectified voltage proportional with the load current, so that the desired voltage regulation is initiated very precisely and abruptly as soon as the permissible maximum of the load current is reached.

It will be understood that each of the elements described above, or two or more together, may also find a useful application in other types of regulator for low-voltage generators differing from the types described above.

While the invention has been illustrated and described as embodied in regulator for low-voltage generators including an RC-circuit control, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a regulator for low-voltage shunt-excited generators operated at greatly varying speeds, particularly for vehicle lighting generators, in combination, voltage divider means connected across the output terminals of the generator; control transistor means connected at its base with an intermediate tapping point of said voltage divider means for applying to said base of said control transistor a predetermined portion of the generator output voltage; at least one second transistor means having its base connected with the collector of said control transistor means for being controlled thereby, and being in circuit with the generator for controlling the output voltage of the latter; first resistor means connected between said collector of said control transistor means and one of the output terminals of the generators for carrying only the collector current of said control transistor; and a parallel-combination including a capacitor means and a second resistor means being connected between said base of said second transistor means and said collector of said control transistor means, said second resistor means carrying only the base current of said second transistor means.

2. In a regulator for low-voltage shunt-excited generators operated at greatly varying speeds, particularly for vehicle lighting generators, in combination, variable voltage divider means connected across the output terminals of the generator, having a movable tap; control transistor means connected at its base with a movable tap of said voltage divider means for applying to said base of said control transistor a predetermined portion of the generator output voltage; at least one second transistor means having its base connected with the collector of said control transistor means for being controlled thereby, and being in circuit with the generator for controlling the output voltage of the latter; first resistor means connected between said collector of said control transistor means and one of the output terminals of the generator for carrying only the collector current of said control transistor; and a parallel-combination including a capacitor means and a second resistor means being connected between said base of said second transistor means and said collector of said control transistor means, said second resistor means carrying only the base current of said second transistor means.

3. In a regulator for low-voltage shunt-excited generators operated at greatly varying speeds, particularly for vehicle lighting generators, in combination, voltage divider means connected across the output terminals of the generators; control transistor means connected at its base with an intermediate tapping point of said voltage divider means for applying to said base of said control transistor a predetermined portion of the generator output voltage; reference voltage means connected between said base of said control transistor means and said intermediate point of said voltage divider means and capable of passing current in direction from said intermediate point to said base, but permitting passage of current in opposite direction only upon application thereto of a threshold or reference voltage of predetermined magnitude; at least one second transistor means having its base connected with the collector of said control transistor means for being controlled thereby, and being in circuit with the generator for controlling the output voltage of the latter; first resistor means connected between said collector of said control transistor means and one of the output terminals of the generator for carrying only the collector current of said control transistor; and a parallel-combination including a capacitor means and a second resistor means being connected between said base of said second transistor means and said collector of said control transistor means, said second resistor means carrying only the base current of said second transistor means.

4. In a regulator for low-voltage shunt-excited generators operated at greatly varying speeds, particularly for vehicle lighting generators, in combination, voltage divider means connected across the output terminals of the generator; control transistor means connected at its base with an intermediate tapping point of said voltage divider means for applying to said base of said control transistor a predetermined portion of the generator output voltage; a Zener diode connected between said base of said control transistor means and said intermediate point of said voltage divider means and capable of passing current in direction from said intermediate point to said base, but permitting passage of current in opposite direction only upon application thereto of a threshold or reference voltage of predetermined magnitude; at least one second transistor means having its base connected with the collector of said control transistor means for being controlled thereby, and being in circuit with the generator for controlling the output voltage of the latter; first resistor means connected between said collector of said control transistor means and one of the output terminals of the generator for carrying the collector current of said control transistor; and a parallel-combination including a capacitor means and a second resistor means being connected between said base of said second transistor means and said collector of said control transistor means, said second resistor means carrying only the base current of said second transistor means.

5. In a regulator for low-voltage shunt-excited generators operated at greatly varying speeds, particularly for vehicle lighting generators, in combination, voltage divider means connected across the output terminals of the generator; control transistor means connected at its base with an intermediate tapping point of said voltage divider means for applying to said base of said control transistor a predetermined portion of the generator output voltage; at least one second transistor means having its base connected with the collector of said control transistor means for being controlled thereby, and being in circuit with the generator for controlling the output voltage of the latter; resistor means connected beween said collector of said control transistor means and one of the output terminals of the generator; and a parallel-combination including a capacitor means and a series-combination of a second resistor means and a rectifier means being connected between said base of said second transistor means and said collector of said control transistor means, said rectifier means being arranged to permit current flow from said base of said second transistor means through said second resistor means.

6. A regulator as claimed in claim 5, wherein said rectifier means is a silicon rectifier.

7. In a regulator for low-voltage shunt-excited generators operated at greatly varying speeds, particularly for vehicle lighting generators, in combination, voltage divider means connected across the output terminals of the generator; control transistor means connected at its base with an intermediate tapping point of said voltage divider means for applying to said base of said control transistor a predetermined portion of the generator output voltage; at least one second transistor means having its base connected with the collector of said control transistor means for being controlled thereby, the emitter-collector circuit of said second transistor means being connected in series with the exciter coil of the generator for controlling the output voltage thereof, the emitter of said second transistor means being connected directly with the other one of the output terminals of the generator; resistor means connected between said collector of said control transistor means and one of the output terminals of the generator; and a parallel-combination including a capacitor means and a series-combination of a second resistor means and a rectifier means being connected between said base of said second transistor means and said collector of said control transistor means, said rectifier means being arranged to permit current flow from said base of said second transistor means through said second resistor means.

8. In a regulator for low-voltage shunt-excited generators operated at greatly varying speeds, particularly for vehicle lighting generators, in combination, voltage divider means connected across the output terminals of the generator; control transistor means connected at its base with an intermediate tapping point of said voltage divider means for applying to said base of said control transistor a predetermined portion of the generator output voltage; second transistor means having its base connected with the collector of said control transistor means for being controlled thereby, the emitter-collector circuit of said second transistor means being connected in series with the exciter coil of the generator for controlling the output voltage thereof, the emitter of said second transistor means being connected directly with the other one of the output terminals of the generator; resistor means connected between said collector of said control transistor means and one of the output terminals of the generators; third transistor means connected at its emitter with said other one of the output terminals of the generator, its base-collector circuit being connected in parallel with the emitter-collector circuit of said second transistor means so that the latter acts as an amplifier for said third transistor means; and a parallel-combination including a capacitor means and a series-combination of a second resistor means and a rectifier means being connected between said base of said second transistor means and said collector of said control transistor means, said rectifier means being arranged to permit current flow from said base of said second transistor means through said second resistor means.

9. A regulator as claimed in claim 8, wherein said second rectifier means are connected in parallel with the emitter-base circuit of said second transistor means, said second rectifier means being arranged for permitting current flow only in a direction opposite the current flow through said emitter-base circuit connected in parallel therewith.

10. A regulator as claimed in claim 3, including a series-combination of at least one resistor and at least one capacitor connected between the collector of said second transistor means and the base of said control transistor.

11. A regulator as claimed in claim 10, wherein said reference voltage means is a Zener diode.

12. A regulator as claimed in claim 5, including a series-combination of at least one resistor and at least one capacitor connected between the collector of said second transistor means and the base of said control transistor.

13. A regulator as claimed in claim 7, including a series-combination of at least one resistor and at least one capacitor connected between the collector of said second transistor means and the base of said control transistor.

14. A regulator as claimed in claim 8, including a series-combination of at least one resistor and at one capacitor connecter between the collector of said second transistor means and the base of said control transistor.

15. A regulator as claimed in claim 9, including a series-combination of at least one resistor and at least one capacitor connected between the collector of said second transistor means and the base of said control transistor.

16. A regulator as claimed in claim 10, including third resistor means connected in parallel with the base-emitter circuit of said control transistor means, said one resistor having a resistance at least five times and not exceeding fifty times that of said third resistor means.

17. A regulator as claimed in claim 16, wherein said one resistor has a resistance at least twenty times and not exceeding thirty times that of said third resistor means.

18. A regulator as claimed in claim 12, including third resistor means connected in parallel with the base-emitter circuit of said control transistor means, said one resistor having a resistance at least five times and not exceeding fifty times that of said third resistor means.

19. A regulator as claimed in claim 14, including third resistor means connected in parallel with the base-emitter circuit of said control transistor means, said one resistor having a resistance at least five times and not exceeding fifty times that of said third resistor means.

20. A regulator as claimed in claim 15, including third resistor means connected in parallel with the base-emitter circuit of said control transistor means, said one resistor having a resistance at least five times and not exceeding fifty times that of said third resistor means.

21. A regulator as claimed in claim 10 for an alternating current generator having output rectifier means, and including transformer means having a primary winding connected in the alternating output circuit of the generator and secondary winding means, current rectifier means in circuit with said secondary winding means for delivering a direct current proportional to the output current of the generator, said current rectifier means being connected with a junction point between the base of said control transistor means and said intermediate tapping point of said voltage divider means, auxiliary rectifier means being connected between said junction point and said intermediate point and arranged to permit passage of the base current of said control transistor means.

22. A regulator as claimed in claim 12 for an alternating current generator having output rectifier means, and including transformer means having a primary winding connected in the alternating output circuit of the generator and secondary winding means, current rectifier means in circuit with said secondary winding means for delivering a direct current proportional to the output current of the generator, said current rectifier means being connected with a junction point between the base of said control transistor means and said intermediate tapping point of said voltage divider means, auxiliary rectifier means being connected between said junction point and said intermediate point and arranged to permit passage of the base current of said control transistor means.

23. A regulator as claimed in claim 14, for an alternating current generator having output rectifier means, and including transformer means having a primary winding connected in the alternating output circuit of the generator and secondary winding means, current rectifier means in circuit with said secondary winding means for delivering a direct current proportional to the output current of the generator, said current rectifier means being connected with a junction point between the base of said control transistor means and said intermediate tapping point of said voltage divider means, auxiliary rectifier means being connected between said junction point and said intermediate point and arranged to permit passage of the base current of said control transistor means.

24. A regulator as claimed in claim 15, for an alternating current generator having output rectifier means, and including transformer means having a primary winding connected in the alternating output circuit of the generator and secondary winding means, current rectifier means in circuit with said secondary winding means for delivering a direct current proportional to the output current of the generator, said current rectifier means being connected with a junction point between the base of said control transistor means and said intermediate tapping point of said voltage divider means, auxiliary rectifier means being connected between said junction point and said intermediate point and arranged to permit passage of the base current of said control transistor means.

25. A regulator as claimed in claim 16 for an alternating current generator having output rectifier means, and including transformer means having a primary winding connected in the alternating output circuit of the generator and secondary winding means, current rectifier means in circuit with said secondary winding means for delivering a direct current proportional to the output current of the generator, said current rectifier means being connected with a junction point between the base of said control transistor means and said intermediate tapping point of said voltage divider means, auxiliary rectifier means being connected between said junction point and said intermediate point and arranged to permit passage of the base current of said control transistor means.

References Cited by the Examiner
UNITED STATES PATENTS

| | | | |
|---|---|---|---|
| 2,832,900 | 4/58 | Ford | 323—22 |
| 2,850,694 | 9/58 | Hamilton | 323—22 |
| 2,850,695 | 9/58 | Bishop | 323—22 |
| 2,951,195 | 8/60 | Domann. | |
| 2,972,712 | 2/61 | Landstorfer. | |
| 2,992,382 | 7/61 | Hetzler et al. | 323—22 |

LLOYD McCOLLUM, *Primary Examiner.*